(12) United States Patent
Hsieh et al.

(10) Patent No.: US 6,558,971 B2
(45) Date of Patent: May 6, 2003

(54) METHOD FOR MANUFACTURING AN LCD PANEL

(75) Inventors: In-Cha Hsieh, Hsinchu Hsien (TW); Yu-Fang Wang, Taoyuan Hsien (TW)

(73) Assignee: Hannstar Display Corp. (TW)

( * ) Notice: Subject to any disclaimer, the term of this patent is extended or adjusted under 35 U.S.C. 154(b) by 0 days.

(21) Appl. No.: 09/930,789

(22) Filed: Aug. 15, 2001

(65) Prior Publication Data

US 2002/0177249 A1 Nov. 28, 2002

(30) Foreign Application Priority Data

May 23, 2001 (TW) ..................................... 090112362 A

(51) Int. Cl.[7] .............................................. H01L 21/00
(52) U.S. Cl. ........................................... 438/30; 349/43
(58) Field of Search .......................... 438/30, 149, 159, 438/597, 233; 257/32, 59, 72, 89, 440, 595, 762; 349/42–44, 110, 138, 187

(56) References Cited

U.S. PATENT DOCUMENTS 6,057,896 A * 5/2000 Rho et al. ..................... 349/42
6,362,028 B1 * 3/2002 Chen et al. .................. 438/149

* cited by examiner

*Primary Examiner*—David Nelms
*Assistant Examiner*—David Vu
(74) *Attorney, Agent, or Firm*—Oppenheimer Wolff & Donnelly, LLP

(57) ABSTRACT

A method for manufacturing an LCD panel comprises the steps of providing a substrate having a conducting layer forming a pad and a conducting line, and an isolation layer on the pad and the conducting line, forming a planarization layer on the isolation layer above the conducting line, and a first through hole in the planarization layer, the first through hole exposing the isolation layer and aligned with the conducting line, forming a masking layer on the isolation layer above the pad, and a second through hole in the masking layer, the second through hole exposing the isolation layer and aligned with the pad, and etching the isolation layer with the masking of the planarization layer and the masking layer, whereby the isolation layer exposed by the first and second through hole is removed.

14 Claims, 6 Drawing Sheets

METHOD FOR MANUFACTURING AN LCD PANEL

BACKGROUND OF THE INVENTION

1. Field of the Invention

The present invention relates to a method for manufacturing a display panel, particularly to a method for manufacturing an LCD panel which eliminates misalignment between the conducting line and through hole of the panel.

2. Description of the Prior Art

There are many conducting lines for connection of circuit elements on an LCD panel. A layer deposited on the conducting lines has a rough surface due to intervals between the conducting lines. This disadvantageously affects the deposition of following layers and is detrimental to the luminance of the panel. A planarization layer must be deposited on the conducting lines to eliminate these problems.

FIGS. 1A~1E are diagrams showing a conventional method for manufacturing an LCD panel, wherein a planarization layer is formed on the conducting lines.

First, as shown in FIG. 1A, a silicon substrate 10 is provided. The substrate 10 has a copper or aluminum conducting layer forming a pad 12a and a conducting line 12b defined by a pattern of the conducting layer. The pad 12a is a connection terminal for a driving IC of the panel. The substrate 10 further has an oxide layer 11 on both the pad 12a and the conducting line 12b, and a nitride layer 13 only on the oxide layer 11 above the pad 12a.

Second, as shown in FIG. 1B, a photoresist layer 14 is deposited, exposed and developed to form through holes 141a and 141b above the pad 12a and conducting line 12b. The through holes 141a and 141b expose the nitride layer 13 and the oxide layer 11 respectively.

Third, as shown in FIG. 1C, with the masking of the photoresist layer 14, the nitride layer 13 and the oxide layer 11 exposed by the through holes 141a and 141b are etched and removed. Thus, through holes 15a and 15b exposing the pad 12a and conducting line 12b are formed. Then, the photoresist layer 14 is removed.

Fourth, as shown in FIG. 1D, a planarization layer 16 of photo type organic planarization material, such as PC-452 or PC403 manufactured by JSR Co. Ltd., or TRAP P202MP manufactured by TOK Co. Ltd., is deposited.

Finally, as shown in FIG. 1E, the planarization layer 16 is exposed and developed so that the planarization layer 16 above the pad 12a is removed and a through hole 17 is formed on the conducting line 12b.

Alternatively, the planarization layer 16 can be composed of non-photo type organic planarization material. The through hole 17 is formed by depositing a photoresist layer on the planarization layer 16, exposing and developing the photoresist layer, and etching the planarization layer with the masking of the photoresist layer.

However, in the conventional method, formation of the through hole 17 includes two exposure steps, which easily leads to a misalignment between through hole 17 and the conducting line 12b, as shown in FIG. 1E.

SUMMARY OF THE INVENTION

Therefore, the object of the present invention is to provide a method for manufacturing an LCD panel, which eliminates misalignment between the conducting line and through hole of the panel.

The present invention provides a method for manufacturing an LCD panel comprising the steps of providing a substrate having a conducting layer forming a pad and a conducting line, and an isolation layer on the pad and the conducting line, forming a planarization layer on the isolation layer above the conducting line, and a first through hole in the planarization layer, the first through hole exposing the isolation layer and aligned with the conducting line, forming a masking layer on the isolation layer above the pad, and a second through hole in the masking layer, the second through hole exposing the isolation layer and aligned with the pad, and etching the isolation layer with the masking of the planarization layer and the masking layer, whereby the isolation layer exposed by the first and second through hole is removed.

In the present invention, the planarization layer is deposited before beginning the formation of the through hole. Thus, the formation of the through hole includes only one exposure step and misalignment is eliminated.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

FIGS. 2A~2E are diagrams showing a method for manufacturing an LCD panel according to a first embodiment of the invention.

Figure 1A:
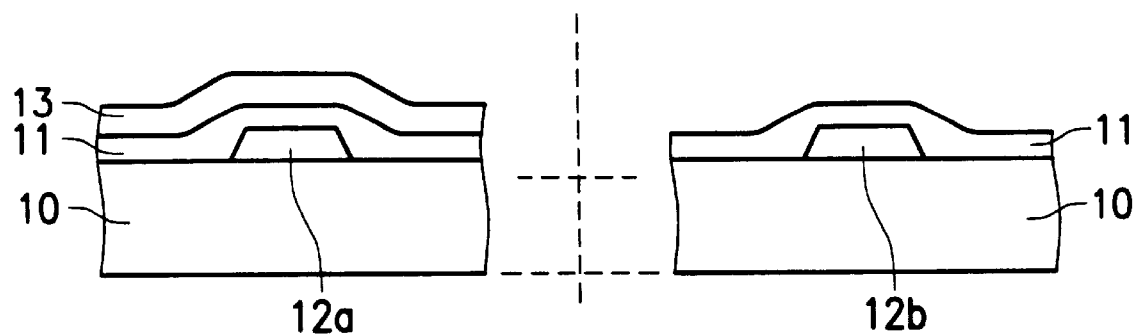
FIGS. 1A~1E are diagrams showing a conventional method for manufacturing an LCD panel.
Figure 1B:
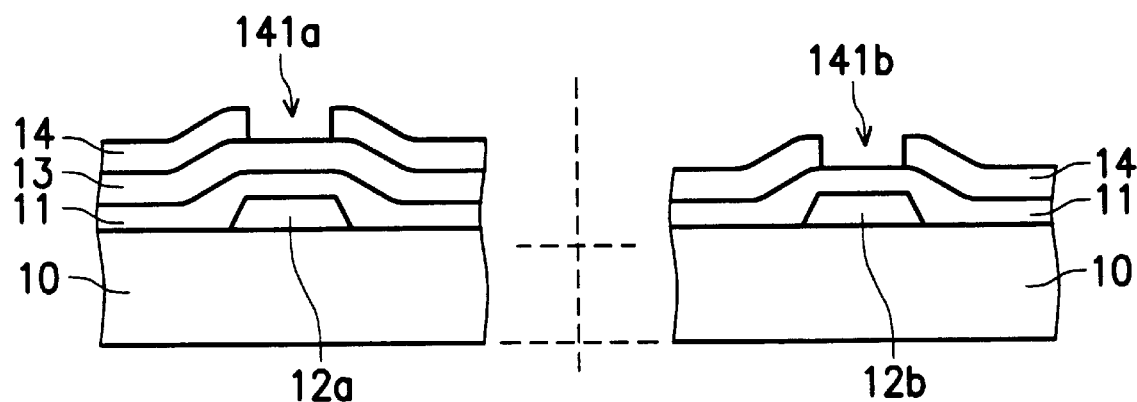
Figure 1C:
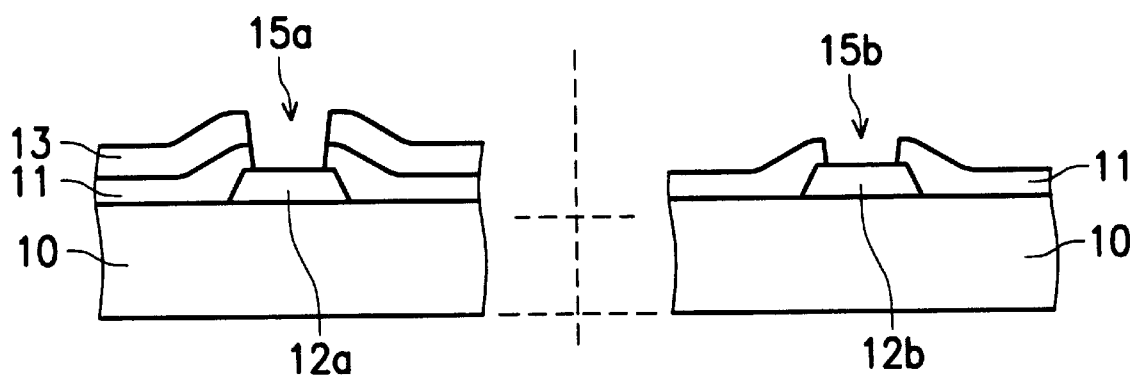
Figure 1D:
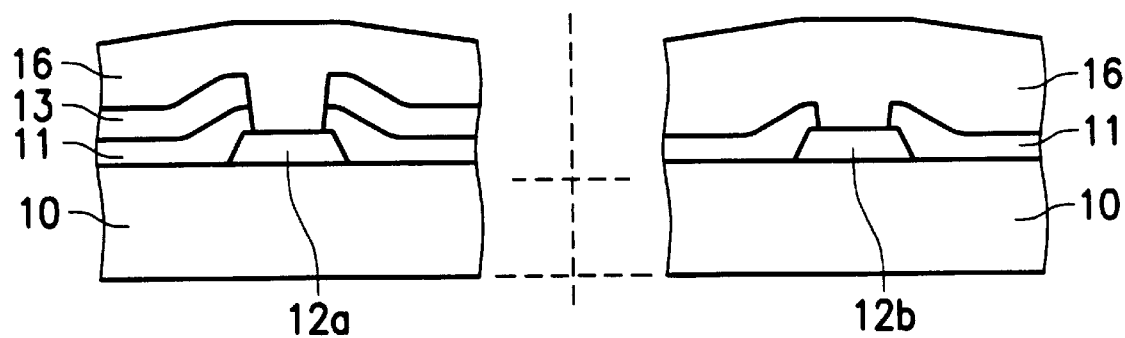
Figure 1E:
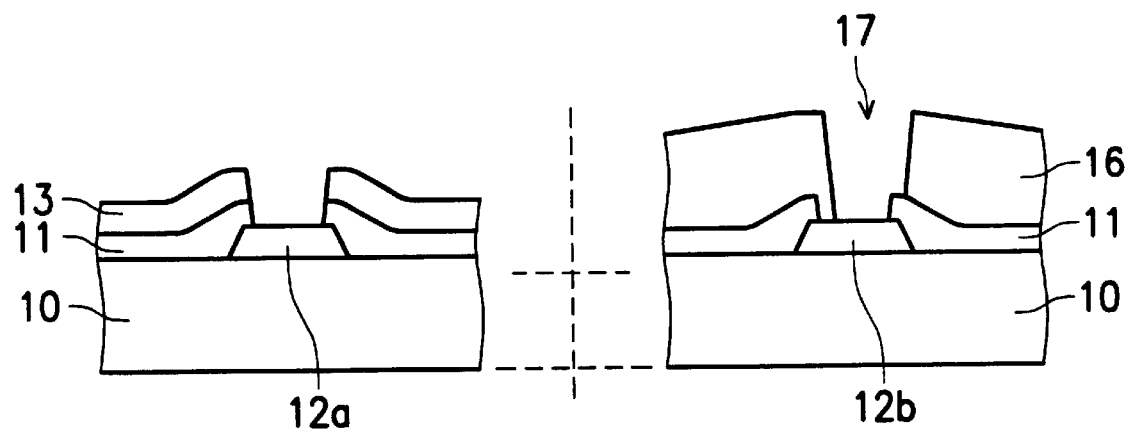
Figure 2A:
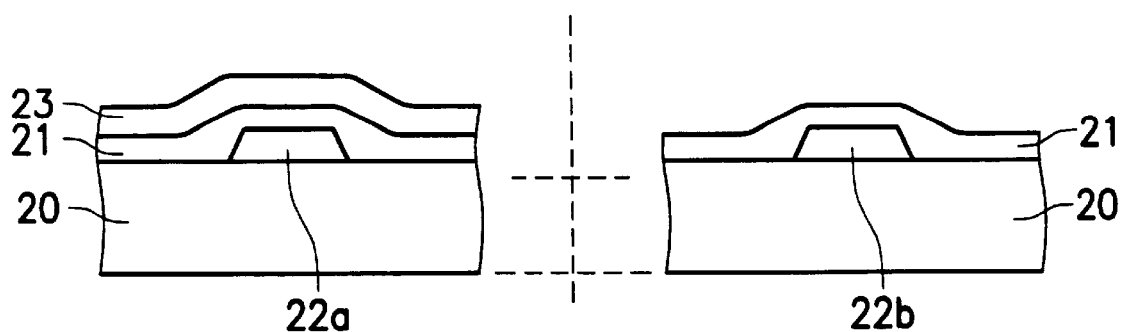
FIGS. 2A~2E are diagrams showing a method for manufacturing an LCD panel according to a first embodiment of the invention.

First, as shown in FIG. 2A, a silicon substrate 20 is provided. The substrate 20 has a copper or aluminum conducting layer forming a pad 22a and a conducting line 22b defined by a pattern of the conducting layer. The pad 22a is a connection terminal for a driving IC of the panel. The substrate 20 further includes an oxide layer 21 on both the pad 22a and the conducting line 22b, and a nitride layer 23 only on the oxide layer 21 above the pad 22a.

Figure 2B:
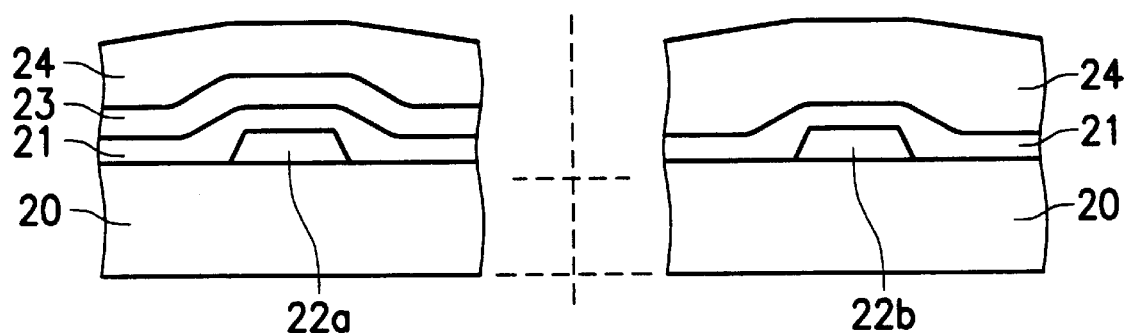

Second, as shown in FIG. 2B, a planarization layer 24 of photo type organic planarization material with a high transparency and a low k, such as PC-452 or PC403 manufactured by JSR Co. Ltd., or TRAP P202MP manufactured by TOK Co. Ltd., is deposited to planarize the surface of the wafer. The deposition of the planarization layer 24 takes place earlier than that in the conventional method. [Before forming a thru hole.]

Figure 2C:
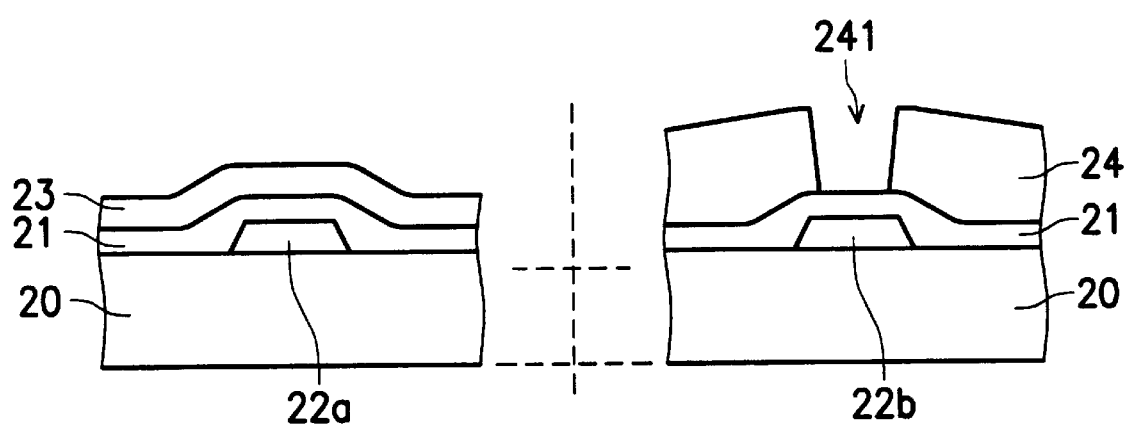

Third, as shown in FIG. 2C, the planarization layer 24 is exposed and developed so that the planarization layer 24 above the pad 22a is removed and a through hole 241 aligned with the conducting line 22b and exposing the oxide layer 21 is formed.

Figure 2D:
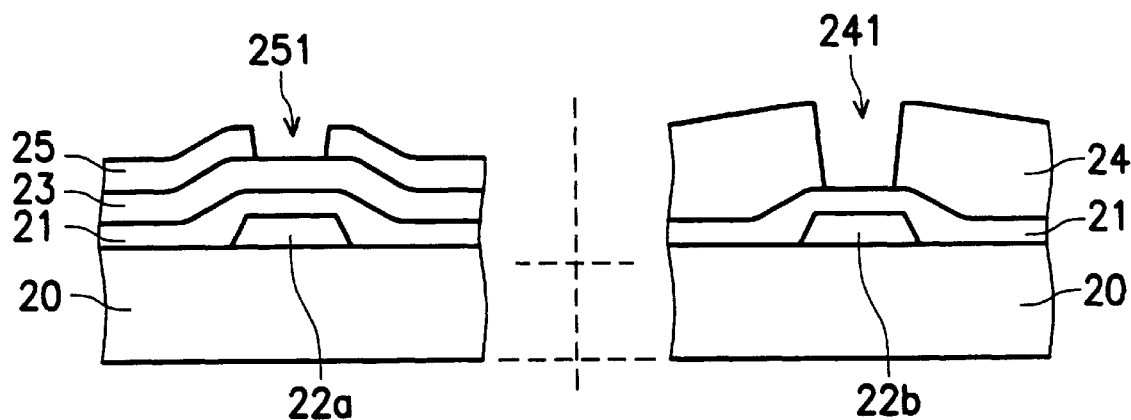

Fourth, as shown in FIG. 2D, a photoresist layer 25 is deposited, exposed and developed so that the photoresist layer 25 above the conducting line 22b is removed and a through hole 251 aligned with the pad 22a and exposing the nitride layer 23 is formed.

Figure 2E:
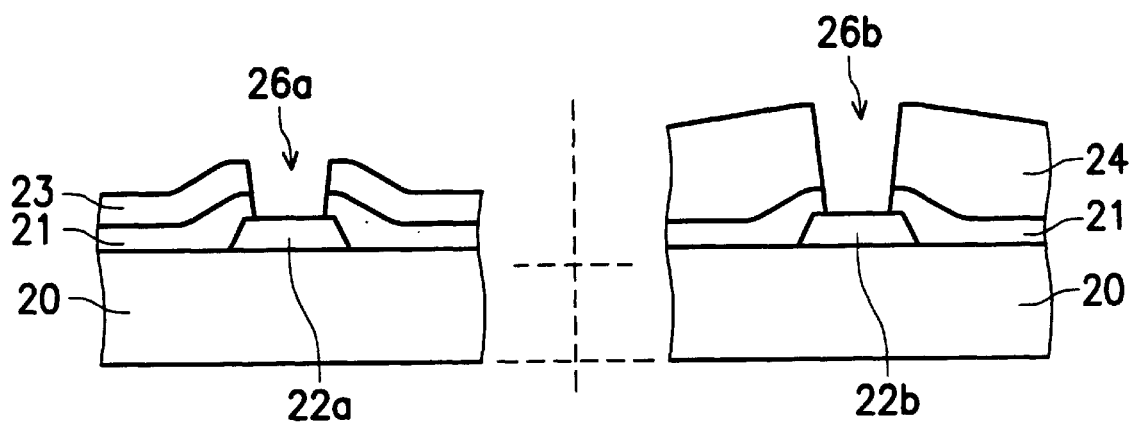

Finally, as shown in FIG. 2E, with the masking of the photoresist layer 25 and the planarization layer 24, the nitride layer 23 and the oxide layer 21 exposed by the through holes 251 and 241 are etched and removed. Thus, through holes 26a and 26b aligned with and exposing the pad 22a and conducting line 22b are formed. Then, the photoresist layer 25 is removed.

FIGS. 3A~3E are diagrams showing a method for manufacturing an LCD panel according to a second embodiment of the invention. The same elements in FIGS. 2A~2E and FIGS. 3A~3E refer to the same symbols for the sake of clarity.

Figure 3A:
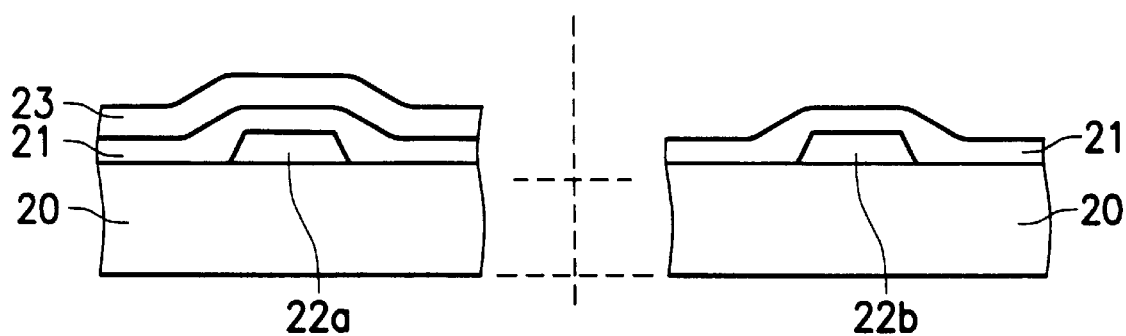
FIGS. 3A~3E are diagrams showing a method for manufacturing an LCD panel according to a second embodiment of the invention.

First, as shown in FIG. 3A, a silicon substrate 20 is provided. The substrate 20 has a copper or aluminum conducting layer forming a pad 22a and a conducting line 22b defined by a pattern of the conducting layer. The pad 22a is a connection terminal for a driving IC of the panel. The substrate 20 further includes an oxide layer 21 on both of the pad 22a and the conducting line 22b, and a nitride layer 23 only on the oxide layer 21 above the pad 22a.

Figure 3B:
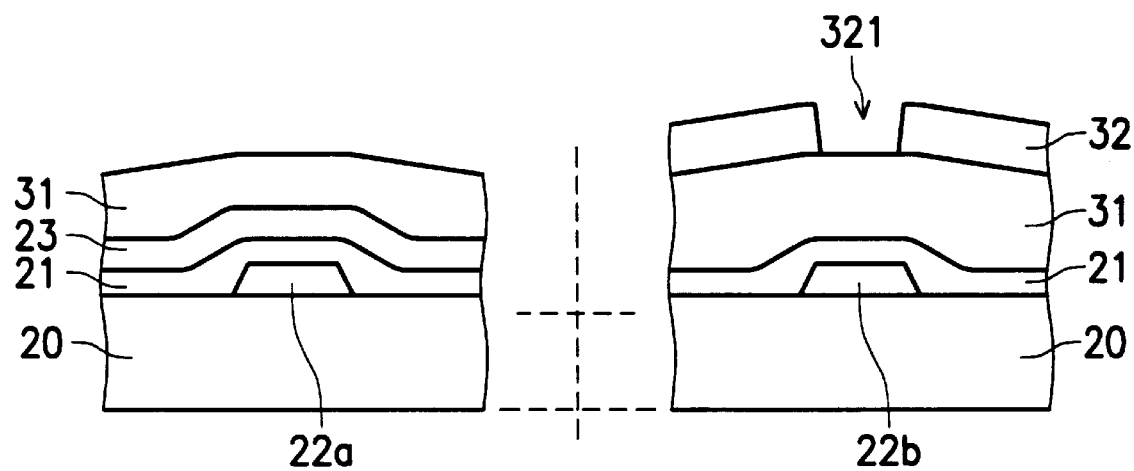

Second, as shown in FIG. 3B, a planarization layer 31 of non-photo type organic planarization material is deposited to planarize the surface of the wafer. A photoresist layer 32 is also deposited on the planarization layer 31 and then exposed and developed so that the photoresist layer 32 above the pad 22a is removed and a hole 321 aligned with the conducting line 22b is formed. The deposition of the planarization layer 31 takes place earlier than that in the conventional method.

Figure 3C:
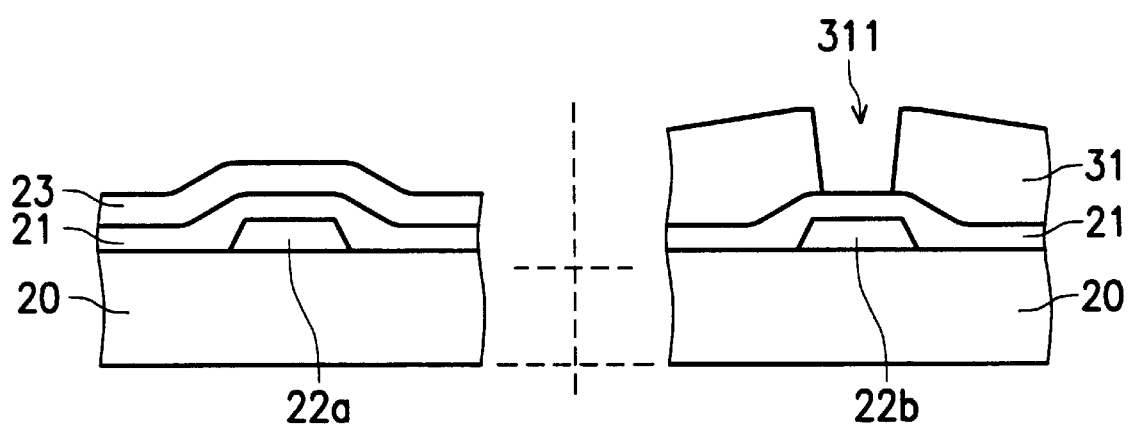

Third, as shown in FIG. 3C, the planarization layer 31 is etched with the masking of the photoresist layer 32, the planarization layer 31 above the pad 22a is removed and a through hole 311 aligned with the conducting line 22b and exposing the oxide layer 21 is formed.

Figure 3D:
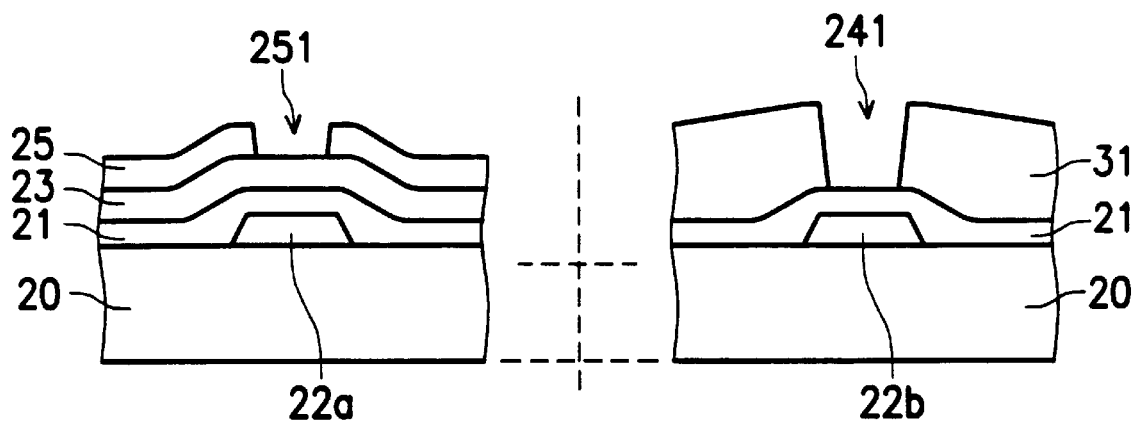

Fourth, as shown in FIG. 3D, a photoresist layer 25 is deposited, exposed and developed so that the photoresist layer 25 above the conducting line 22b is removed and a through hole 251 aligned with the pad 22a and exposing the nitride layer 23 is formed.

Figure 3E:
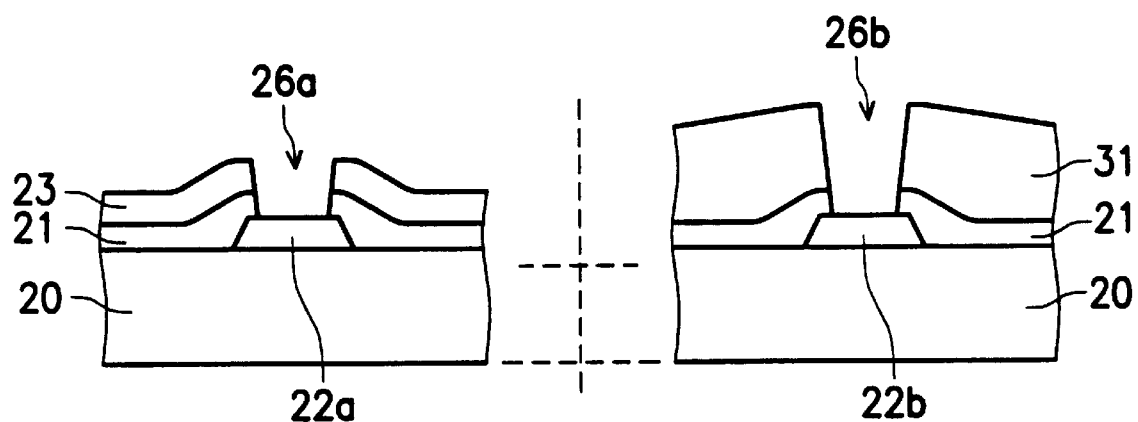

Finally, as shown in FIG. 3E, with the masking of the photoresist layer 25 and the planarization layer 31, the nitride layer 23 and the oxide layer 21 exposed by the through holes 251 and 241 are etched and removed. Thus, through holes 26a and 26b aligned with and exposing the pad 22a and conducting line 22b are formed. Then, the photoresist layer 25 is removed.

In conclusion, the present invention provides a method for manufacturing an LCD display, wherein the planarization layer is deposited before the formation of the through holes. Thus, the formation of the through holes includes only one exposure step and the misalignment in the conventional method is thus eliminated.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for manufacturing an LCD panel comprising the steps of:
   providing a substrate having a pad and a conducting line, and an isolation layer formed on the pad and the conducting line;
   forming a planarization layer on the isolation layer above the conducting line, and a first through hole in the planarization layer, the first through hole exposing the isolation layer and aligned with the conducting line;
   forming a mask layer on the isolation layer above the pad, and a second through hole in the mask layer, the second through hole exposing the isolation layer and aligned with the pad; and
   etching the isolation layer with the masking of the planarization layer and the mask layer, whereby the isolation layer exposed by the first and second through hole is removed.

2. The method as claimed in claim 1 further comprising the steps of:
   depositing the planarization layer; and
   removing the planarization layer above the pad and forming the first through hole in the planarization layer above the conducting line.

3. The method as claimed in claim 1 further comprising the steps of:
   depositing the mask layer; and
   removing the mask layer above the conducting line and forming the second through hole in the mask layer above the pad.

4. The method as claimed in claim 1 wherein the planarization layer is composed of a photo type organic planarization material.

5. The method as claimed in claim 1 further comprising the step of exposing and developing the planarization layer to form the first through hole.

6. The method as claimed in claim 1 wherein the planarization layer is composed of a non-photo type organic planarization material.

7. The method as claimed in claim 6 further comprising the steps of:
   forming a first photoresist layer on the planarization layer; and
   exposing and developing the first photoresist layer and etching the planarization layer with the masking of the exposed and developed first photoresist layer to form the first through hole.

8. The method as claimed in claim 1 wherein the isolation layer on the pad comprises an oxide layer and a nitride layer.

9. The method as claimed in claim 1 wherein the isolation layer on the conducting line is an oxide layer.

10. The method as claimed in claim 1 wherein the substrate is a silicon substrate.

11. The method as claimed in claim 1 wherein the mask layer is of a photoresist material.

12. The method as claimed in claim 11 further comprising the steps of exposing and developing the mask layer to form the second through hole.

13. The method as claimed in claim 1 wherein the conducting layer is copper.

14. The method as claimed in claim 1 wherein the conducting layer is aluminum.

* * * * *